United States Patent
Breen et al.

(10) Patent No.: US 9,060,076 B2
(45) Date of Patent: *Jun. 16, 2015

(54) METHODS AND SYSTEMS FOR MANAGING A CALL SESSION

(71) Applicant: AT&T Intellectual Property I, L.P., Atlanta, GA (US)

(72) Inventors: Thomas Breen, Snellville, GA (US); William Marczak, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 59 days.

This patent is subject to a terminal disclaimer.

(21) Appl. No.: 13/914,349

(22) Filed: Jun. 10, 2013

(65) Prior Publication Data

US 2013/0272297 A1    Oct. 17, 2013

Related U.S. Application Data

(63) Continuation of application No. 12/538,837, filed on Aug. 10, 2009, now Pat. No. 8,462,915, which is a continuation of application No. 10/963,106, filed on Oct. 12, 2004, now Pat. No. 7,573,982.

(51) Int. Cl.

| | |
|---|---|
| *H04M 11/04* | (2006.01) |
| *H04M 3/51* | (2006.01) |
| *H04M 3/523* | (2006.01) |
| *H04M 7/12* | (2006.01) |
| *H04L 29/06* | (2006.01) |
| *H04L 12/66* | (2006.01) |

(52) U.S. Cl.
CPC ............ *H04M 11/04* (2013.01); *H04M 3/5116* (2013.01); *H04M 3/5183* (2013.01); *H04M 3/5237* (2013.01); *H04M 7/1205* (2013.01); *H04M 2242/04* (2012.01); *H04L 65/1069* (2013.01); *H04L 12/66* (2013.01)

(58) Field of Classification Search
CPC . H04M 3/5116; H04M 3/5237; H04M 11/04; H04M 7/1205; H04M 3/5193; H04M 2242/04; H04L 12/66; H04L 65/1069
USPC .................. 379/37–45; 370/352, 392, 389
See application file for complete search history.

(56) References Cited

U.S. PATENT DOCUMENTS

| | | | |
|---|---|---|---|
| 4,310,726 A | 1/1982 | Asmuth | |
| 5,379,337 A | 1/1995 | Castillo et al. | |
| 5,388,145 A | 2/1995 | Mulrow et al. | |
| 6,075,853 A | 6/2000 | Boeckman et al. | |
| 6,678,357 B2 | 1/2004 | Stumer et al. | |
| 6,744,858 B1 * | 6/2004 | Ryan et al. | 379/45 |
| 6,914,896 B1 | 7/2005 | Tomalewicz | |
| 7,257,109 B2 | 8/2007 | Sylvain | |
| 7,573,982 B2 | 8/2009 | Breen et al. | |
| 8,462,915 B2 | 6/2013 | Breen et al. | |
| 2003/0109245 A1 * | 6/2003 | McCalmont et al. | 455/404 |
| 2004/0184584 A1 | 9/2004 | McCalmont et al. | |
| 2005/0190892 A1 * | 9/2005 | Dawson et al. | 379/37 |

* cited by examiner

*Primary Examiner* — Melur Ramakrishnaiah

(57) ABSTRACT

Methods and systems are provided for managing call sessions on public and private networks. The methods and systems operate to receive and send voice over internet protocol (VoIP) communications using a network, such as an IP network. The methods and systems also operate to receive and send emergency information over IP and other data networks. Based on certain criteria, the methods and systems determine whether to transfer a VoIP communication and/or emergency information to another entity associated with the IP network.

20 Claims, 3 Drawing Sheets

METHODS AND SYSTEMS FOR MANAGING A CALL SESSION

This application is a continuation of U.S. patent application Ser. No. 12/538,837, filed on Aug. 10, 2009, which is currently allowed and is a continuation of U.S. patent application Ser. No. 10/963,106, filed on Oct. 12, 2004, now U.S. Pat. No. 7,573,982, both of which are herein incorporated by reference in their entirety.

TECHNICAL FIELD

The present invention relates to managing call sessions between public and private networks. More particularly, the present invention is related to transferring information accumulated by one entity to a subsequent entity in a telecommunication environment.

BACKGROUND OF THE INVENTION

Emergency situations require prompt notification of the particular situation to an appropriate responder (e.g. the police, fire department, ambulance, poison control, etc.). Typically during an emergency by dialing a special telephone number, such as 9-1-1, the caller is connected to an E9-1-1 Control office which typically relays the call to an appropriate destination to gather information from the caller, such as a Public Safety Answering Point (PSAP).

A database called an Automatic Location Identification (ALI) database is generally associated with a PSAP. The ALI database is typically part of a database management system having a database server through which the ALI database is queried. The ALI database contains records that associate telephone numbers with names and locations. When a 9-1-1 call is made, the PSAP queries the ALI database for location and name information. The query contains the telephone number associated with the telephone that made the 9-1-1 call. The ALI database passes the name and location data back to the PSAP in response to the query.

Automatic Number Identification (ANI) is a switch feature that allows a 9-1-1 caller's telephone number to be delivered with the call and displayed at a PSAP. This feature is useful for identifying the caller and, if the caller cannot communicate, for callback. Using subscriber information stored by telephone companies based upon telephone number, the caller's name and address can be provided as part of Automatic Location Identification (ALI) databases. In particular, the PSAP, using ANI/ALI controllers, can query the ALI database using the caller's number provided by the ANI feature to ascertain name and address information. Computer-Aided Dispatch (CAD) and mapping applications provide the capability to pinpoint the caller's location on a map. CAD systems may also provide the nearest police car, ambulance, fire truck, etc. relative to the caller's location.

However, the service areas of many central offices do not correspond to the particular PSAP area of responsibility. For example, a municipal police department may geographically include an area outside the area served by the central office. Similarly, the municipal police department may encompass an area of responsibility that is less expansive than the area served by the central office. Thus, when a 9-1-1 call is answered by the first PSAP that receives the call, that PSAP will collect information from the caller. If that first PSAP does not serve the caller's area, the first PSAP has to transfer the call to another PSAP responsive to the 9-1-1 caller's area. There is no effective way to transfer a call from one PSAP to another while maintaining the information gathered from the 9-1-1 caller. Data gathered and keyed into the system by the original 9-1-1 dispatcher cannot be disseminated to the subsequent PSAPs and, with the exception of the caller's telephone number, the caller must unnecessarily repeat their information to the next PSAP contact.

SUMMARY OF THE INVENTION

According to the invention, systems and methods are provided for transferring accumulated information from a first entity, such as a first PSAP, to a subsequent entity, such as a subsequent PSAP, in a telecommunication environment.

In accordance with embodiments of the invention, a method and a system enables one PSAP to transfer voice and other data to a subsequent PSAP over a network. The first PSAP and/or second and subsequent PSAPs include hardware and software functionality for converting incoming voice calls to VoIP, allowing the VoIP call and other data to be directly passed through a network, such as an IP network, using various protocols. According to the invention, the voice and other data may be passed over the IP network to the second and/or subsequent PSAPs. Thus, the improved emergency response system tends to prevent the second and/or subsequent PSAPs from having to re-collect the information collected by the original PSAP, thereby improving efficiency, response times, and reducing costs to the emergency response system.

These and various other features as well as advantages, which characterize the present invention, will be apparent from a reading of the following detailed description and a review of the associated drawings.

DETAILED DESCRIPTION OF THE INVENTION

Figure 1:
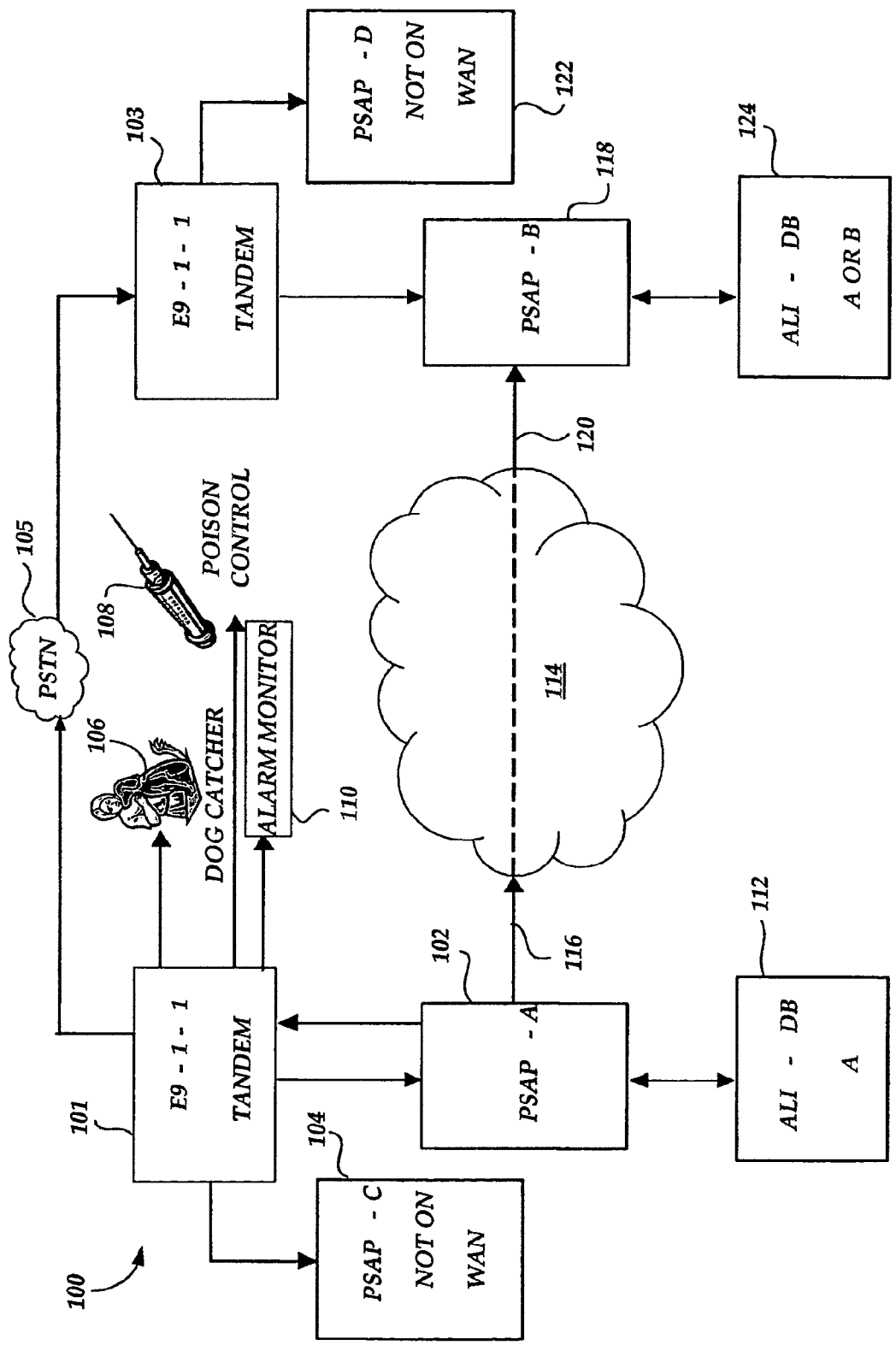
FIG. 1 illustrates an emergency response network according to an embodiment of the invention.

In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

A block diagram of an exemplary operating environment will be described below in reference to FIG. 1 in which embodiments of the present invention may be implemented. It will be appreciated that the invention is adaptable to other operational environments as well and the invention is not intended to be limited to any specific operating environment. The various embodiments described below are provided by way of illustration only and should not be construed to limit the invention. Those skilled in the art will readily recognize that this invention will continue to function as the current E9-1-1 infrastructure evolves to a TCP/IP environment and some of the current infrastructure components are eliminated.

According to the embodiment depicted in FIG. 1, primary components of an inventive system 100 include an Enhanced (E9-1-1) tandem 101 (referred to as the first E9-1-1 Tandem)

in communication with a number of associated entities. The first E9-1-1 tandem 101 may communicate with a second (or subsequent) E9-1-1 tandem 103 via Public Switched Telephone Network (PSTN) 105. However, those skilled in the art will recognize that the invention is operable without utilizing the PSTN 105.

In addition to other services, E9-1-1 tandems help ensure that telephony communications networks provide E9-1-1 call centers, also known as Public Safety Answering Points (PSAPs), information necessary to locate and identify a caller in an emergency. Although FIG. 1 shows two E9-1-1 tandems and related components in communication with each E9-1-1 tandem, one of ordinary skill in the art will appreciate that the present invention is not limited to such a network environment and is applicable to other network environments as well.

PSAP-A 102 is in communication with the first E9-1-1 tandem 101 and typically services a predetermined area should an emergency situation arise. As described above however, the service areas of the E9-1-1 Tandem 101 may not correspond to the area of responsibility of PSAP-A 102. The E9-1-1 Tandem 101 is also in communication with PSAP-C 104, and other entities, such as a dog catcher 106, poison control 108, alarm monitor 110, and others for example. In alternative embodiments, the other entities, such as the dog catcher 106, poison control 108, alarm monitor 110, etc. may also be connected to an IP network 114 and operable to receive/send voice over internet protocol (VoIP).

With continuing reference to FIG. 1, PSAP-A 102 is also in communication with an Automatic Location Identification (ALI) database 112. PSAP-C 104 is also in communication with an ALI database, which may be ALI database 112 or another ALI database.

According to this embodiment of the invention, PSAP-A 102 is in communication with the Internet Protocol (IP) network 114, which for example may be a state-wide or county-wide emergency response network. PSAP-A 102 may include a computer operable in a networked environment using logical connections to other computers through a TCP/IP network, such as the Internet. It should be appreciated that the particular network interface may also be utilized to connect to other types of networks and remote computer systems. The IP network 114 includes any TCP/IP-based (Transmission Control Protocol/Internet Protocol) data communication network such as the world-wide web portion of the Internet, for example.

PSAP-A 102 is connected to the IP network 114 via network link 116, such as a TCP/IP-based communication link. As will be discussed further below, PSAP-A 102 and PSAP-B 118 communicate with one another across IP network 114. Those skilled in the art will recognize that any number (n) of PSAPs and other entities may be in communication with the IP network 114, and the invention is not intended to be limited to any examples or embodiments discussed herein.

PSAP-B 118 is in communication with the IP network 114 via network link 120. PSAP-B 118 is also in communication with the second E9-1-1 tandem 103 and typically services a predetermined area should an emergency situation arise. The E9-1-1 Tandem 103 communicates with PSAP-D 122, and other entities, as described above in reference to E9-1-1 tandem 101. PSAP-B 118 also communicates with an Automatic Location Identification (ALI) database 124. PSAP-D 122 is also in communication with an ALI database, which may be ALI database 124 or another ALI database.

Figure 2:
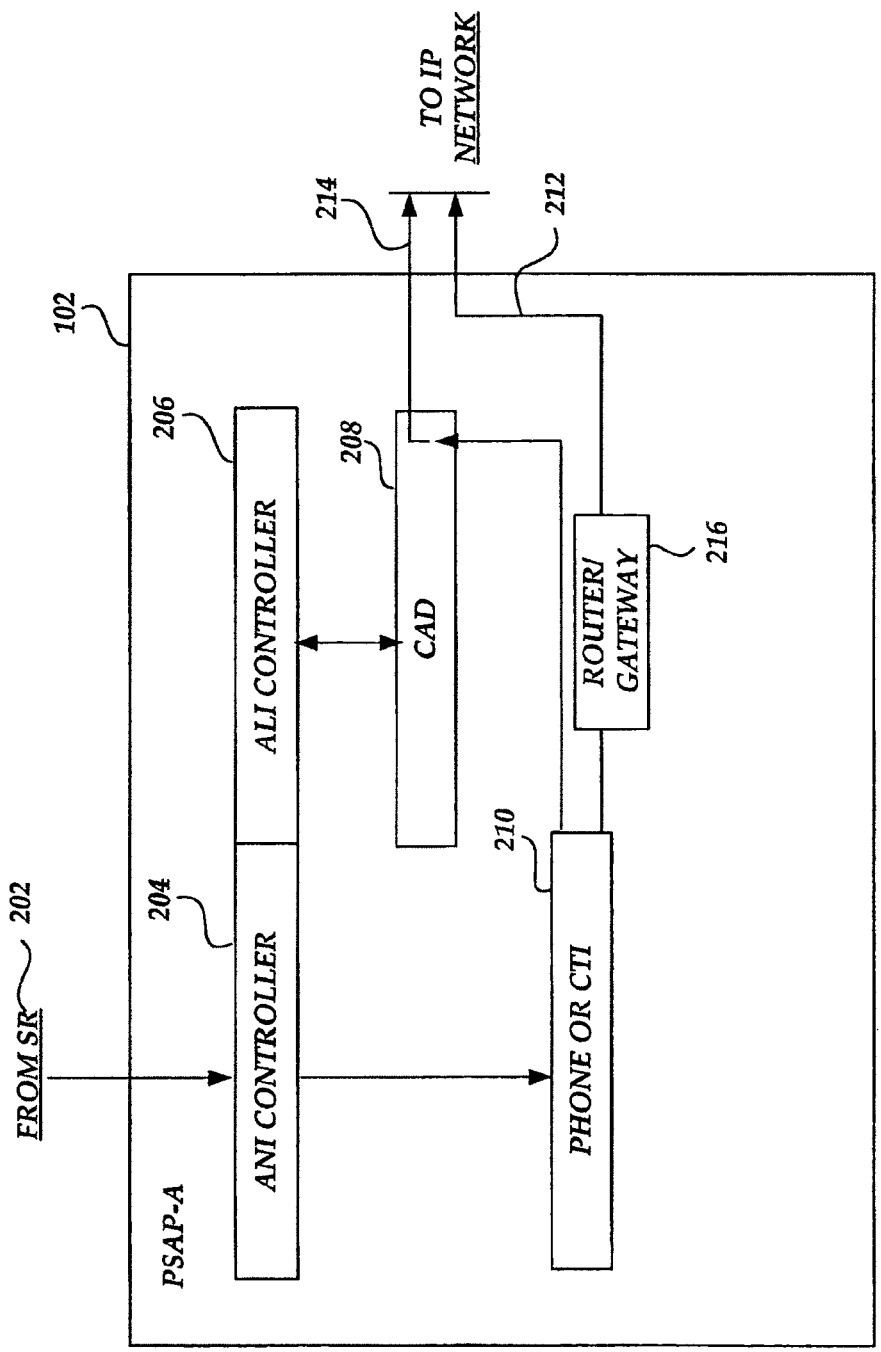
FIG. 2 illustrates a Public Safety Answering Point ("PSAP") in the emergency response network of FIG. 1, according to an embodiment of the invention.

Referring now to FIG. 2, PSAP-A 102 is shown in greater detail. In accordance with this embodiment of the invention, PSAP-A 102 receives a signal from a selective router (SR) 202 associated with the E9-1-1 Tandem. PSAP-A 102 includes an Automatic Number Identification (ANI) controller 204, ALI controller 206, Computer-Aided Dispatch (CAD) 208 (or equivalent) module, and a phone 210. The ANI and ALI controllers 204 and 206 generally interface with the caller and one or more ALI databases and/or other external interfaces, as is well known in the art described above. The ALI databases may include wireless and landline related information. For wireless callers, the ALI databases may include updated longitude/latitude coordinates. The phone 210 is preferably an IP telephone, operable to receive and transmit VoIP, or an equivalent Computer Telephony Integration (CTI) application, a fully integrated computer managed phone replacement software system.

VoIP pertains to a category of hardware and software that enables use of the Internet, or other similar network, as a transmission medium for telephone calls by sending voice data in packets using Internet Protocol (IP) rather than by traditional circuit transmissions of the PSTN. There are many Internet telephony applications available. VoIP is also referred to as Internet telephony, IP telephony, or Voice over the Internet (VoI). In alternative embodiments, a CTI application may be used in place of the phone. The phone 210 and CAD 208 are in communication with the IP network via links 212 and 214. PSAP-A 102 and other PSAPs connected to the IP network 114 may include a router/gateway 216 capable of software level protocol conversion as well.

When the first E9-1-1 tandem 101 receives a 9-1-1 call from a caller, (wireless or landline), the E9-1-1 tandem routes the call to a first entity, such as PSAP-A 102, PSAP-C 104. As described further below, the E9-1-1 tandem 101 may instead route the call to another E9-1-1 tandem 103 via PSTN 105. Once the call is selectively routed to a PSAP, such as to PSAP-A 102, for example, PSAP-A 102 typically collects various information from the caller, such as the nature of the call, description of an injury, time duration since an injury, description of a perpetrator, description of an animal, location information, contact information, poison information, vehicle descriptions, velocity/direction data, etc. As described above however, on occasion PSAP-A 102 will not serve the caller's area and the call will have to be transferred to another entity, such as PSAP-B 118 for example.

However, there may be occasions where various PSAPs may not have compatible VoIP equipment. In these circumstances, the first PSAP may query a subsequent PSAP with an acknowledgment message, requesting acknowledgement from the subsequent PSAP of a recognized transmission schema, such as (but not limited to) DOJ-XML, etc. Those skilled in the art will appreciate that the schema used need only be one recognizable and usable by the sending and receiving PSAPs. Therefore it is not limited to using DOJ-XML. Each PSAP may then configure/utilize equipment, enabling the free-flow of information between the entities. Furthermore, a first PSAP on the IP network 114 may send handshake messages across the network to determine which other PSAPs/entities are also connected to the network. The subsequent PSAPs also may only accept certain types of data while rejecting/ignoring other types. Preferably, each PSAP includes intelligent software and/or hardware to recognize when other PSAPs are added to, moved, or deleted from the IP network 114. Additionally, each PSAP may include speed-dialing capability for automatically connecting to a subsequent PSAP across the IP network 114.

Figure 3:
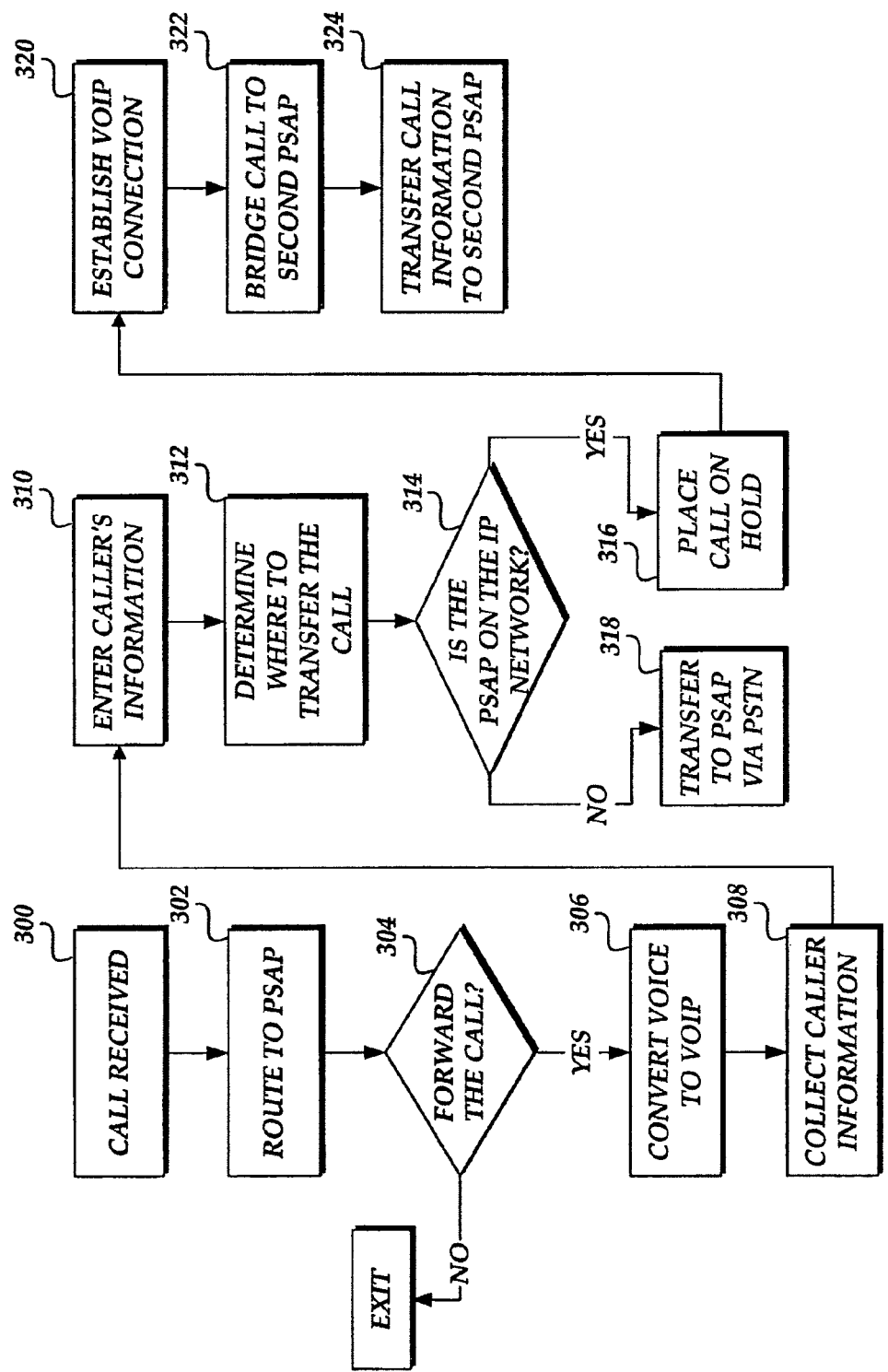
FIG. 3 illustrates a flowchart describing logical operations for use in an emergency response network, according to an embodiment of the invention.

Referring now to FIG. 3, a flow chart is shown in accordance with a preferred embodiment of the invention. At 300, a 9-1-1 call is received by an E9-1-1 Tandem from a caller who is experiencing an emergency situation, for example. Based on the location of the caller, the E9-1-1 Tandem, at 302 selectively routes the call to a PSAP, such as PSAP-A depicted in FIG. 2. At 304, the PSAP determines whether the call should be forwarded from the current PSAP to a subsequent PSAP, based on service area or jurisdiction of the current PSAP, for example.

If the PSAP determines that it is the proper authority for servicing the caller, the flow exits and the current PSAP responds to the call based on the caller's information. If the PSAP determines the call must be transferred to a subsequent PSAP, the current PSAP may convert the incoming call to a VoIP based call at 306. According to one alternative embodiment, the current PSAP may also convert all incoming calls to VoIP. According to another alternative embodiment, the current PSAP may only convert a call to VoIP when it is determined that the call needs to be transferred to a subsequent PSAP. Those skilled in the art will appreciate the various ways in which to convert the incoming voice call to VoIP. In other illustrative alternative embodiments, the E9-1-1 Tandem may also have VoIP functionality, operable to convert voice calls to VoIP before delivering the call to a PSAP.

At 308, the current PSAP receives ANI and/or ALI data from the caller using the ANI controller and/or ALI controller. The current PSAP also collects other information such as the nature of the call, description of an injury, time duration since an injury, description of a perpetrator, description of an animal, location information, contact information, etc. According to this method, the additional information may be passed to a subsequent PSAP, as described below. The calltaker, at 310, enters the caller's information into an information collecting system, such as the CAD 208, or another equivalent system. Alternatively, the current PSAP may collect and enter the caller's information into the information collection system before determining whether to transfer the caller to a subsequent PSAP.

If the calltaker determines that the caller should be transferred to a subsequent PSAP, one aspect of the present invention provides a means for passing the collected information from the current PSAP, such as PSAP-A of FIG. 1 to a subsequent PSAP, such as PSAP-B 118, for example. At 312, the calltaker determines the proper destination or subsequent PSAP, using various Standard Operating Procedures (SOP) to determine the PSAP or entity that should service the caller. These SOP processes are considered Business As Usual (BAU) for an E9-1-1 PSAP and they are sometimes done manually by the call-taker, and sometimes they are done with the aid of a CAD or similar application. If at 314 the PSAP determines that the subsequent PSAP is also in communication with the IP network 114 as described above, the first PSAP through its CTI application and/or ANI controller may place the call on hold at 316. If the subsequent PSAP is not in communication with the IP network 114, the first PSAP alerts the E9-1-1 Tandem to transfer the call across the PSTN 105 at 318 to a subsequent E9-1-1 Tandem or PSAP.

If the subsequent PSAP is in communication with the IP network 114, after placing the call on hold, the current PSAP establishes a VoIP connection with the IP network and the subsequent PSAP, over a TCP/IP link for example at 320. According to this embodiment, the subsequent PSAP includes operability to converse with the caller via VoIP or convert the VoIP data packets back to analog before talking with the caller. At 322, the original call is "bridged" into the IP network 114. At this point, the original calltaker at the original PSAP may drop out of the call if desired, or retain control and disconnect the subsequent PSAP if necessary. For example, if the subsequent PSAP is not the proper entity for servicing the call, the original PSAP may disconnect the subsequent PSAP and locate another PSAP to transfer the caller to. For situations where the current PSAP retains control of the original call, the original Emergency Message trunk (EM) may stay up during the entire call. Accordingly, the EM trunk group may require additional members or additional bandwidth to allow for longer call duration periods.

Once the call is bridged over the IP network to the subsequent PSAP, at 324 the call is transferred, using DOJ-XML schema for example, to the subsequent PSAP along with any collected information by the first PSAP. The collected information may include text, video, audio, images, etc. The original ALI, ANI and/or call back number (CBN) is also transferred to the subsequent PSAP. According to various embodiments, the first PSAP may transfer any/all collected data to one or more subsequent PSAPs across the IP network 114. In alternative embodiments, as described above, the call may not be converted to VoIP until a decision is made to invoke a PSAP-to-PSAP transfer across the IP network 114.

Those skilled in the art will appreciate that for all practical purposes the one or more subsequent PSAPs in communication with the IP network 114 appear to be call-taker/agent positions at the original or anchor PSAP 102. According to an embodiment of the invention, one or more subsequent PSAPs may be connected to the caller and to the anchor PSAP's network and ALI database 112 for the duration of the call. ALI data may be updated by re-querying the original ALI database 112, for example by invoking a mid-call location update (MCLU) request on a Phase 2 wireless E9-1-1 call (MCLU is a term used in Telecommunications Industry Association J-STD-036, the governing "industry standard document" for Phase 2 wireless E9-1-1 call handling). The MCLU process is generally understood by those skilled in the art.

Additionally, according to another embodiment, the subsequent PSAP may "re-bid" for the ALI data. Any "re-bid" request may be routed to the original (or anchor) PSAP and issued to the original PSAP's ALI database. Alternatively, the bid may be made to a central repository containing the ALI data. The anchor PSAP's database or central repository response may be routed through the anchor PSAP to the requesting/subsequent PSAP. Furthermore, those skilled in the art will appreciate that "true" secondary PSAPs (those that only receive calls from other PSAPs) may not require EM trunks, only requiring communication via the IP network 114 and other related networks other than the traditional emergency services network.

Based on the discussion above, the method according to an embodiment of the invention enables one PSAP to transfer voice and other data to a subsequent PSAP over the IP network 114. The first PSAP and/or second and subsequent PSAPs include hardware and software functionality for converting incoming voice calls to VoIP, allowing the VoIP and other data to be passed through the IP network 114 directly from the Phone or CTI equipment 210 or through the CAD (or equivalent) equipment 208 using various protocols. According to the method, the voice and other data may be passed over the IP network 114 to the second and/or subsequent PSAPs. Thus, the improved emergency response system tends to prevent the second and/or subsequent PSAPs from having to re-collect the information collected by the original PSAP, thereby improving efficiency, response times, and reducing costs to the emergency response system. In an alternative embodiment, the VoIP and/or other collected data may be stored at the anchor call-receiving PSAP (such as PSAP 102) in a shared folder and a link, such as a hyperlink, or token may be passed to the second or subsequent PSAPs. The link or token allows the second or subsequent PSAP to "reach" across the network and access the VoIP and other data from the anchor PSAP or other designated services.

According to one embodiment of the invention, there may be scenarios where the original or anchor PSAP is not able to pass VoIP and/or data across the IP network 114 at a specific time. For these situations, all of the collected data and/or VoIP may be stored at the anchor PSAP or other repository. In other scenarios where the anchor PSAP is not able to pass data to subsequent PSAP(s), any data added by a subsequent PSAP may be sent across the IP network 114 to the anchor PSAP and saved at the anchor PSAP at some desired time intervals. In these instances the anchor PSAP may manage all data retention requirements. Alternatively, a central repository, such as a server at the anchor PSAP or other location, may be updated in a timely manner (hourly/daily/weekly etc.) to take the long term retention responsibilities off of any individual PSAP. In some cases, the anchor PSAP may maintain a record of all calls by electronically writing and saving the VoIP and/or collected data to its server or disks.

According to an embodiment of the invention, it may be preferred that the original or anchor PSAP, such as PSAP-A 102, stay in communication with the caller and one or more subsequent PSAP, i.e. remain the anchor during the entire call by utilizing a call conferencing feature such as 3-way calling. This may require any involved subsequent PSAPs to pass along to the "anchor" PSAP any data "gathered" by the subsequent PSAPs, making the "anchor" PSAP the repository for all information associated with the call. Each time a call transfer takes place, the subsequent PSAP has the logical appearance of being another call-taker/agent position within the anchor PSAP. As described herein, it is preferred to update collected data and PSAP connectivity information in timely manner (hourly/daily/weekly etc.) to take the long term retention responsibilities off of any individual PSAP, also allowing data retrieval on demand in a real-time or near real-time manner.

The systems described above, preferably include real-time monitoring capability, or linking alarms generated to customer premise equipment (CPE) associated with a PSAP when failures occur. A particular CPE may react to alarms and allow normal (E9-1-1 Tandem based) call transfer capability with voice and ANI at a minimum, if necessary. The CPE associated with an upstream or original PSAP may also detect and provide an alarm or similar form of alerting when a subsequent PSAP is not connected to the WAN, when the data (voice and/or data packets) are not successfully delivered to the subsequent PSAP, when server or other space used to store the data associated with the call is nearing capacity limitations, when the "anchor" PSAP connectivity to the WAN is lost, or when the subsequent PSAP capabilities and data type profiles are not known or recognized. Preferably, the CPE allows normal (E9-1-1 Tandem based) call transfer with voice and ANI to occur when the capabilities of the subsequent PSAP are unknown.

It will be appreciated that the embodiments of the invention described above provide methods and systems for managing call sessions on public and private networks. The methods and systems operate to receive and send voice over internet protocol (VoIP) communications using an IP network. The methods and systems also operate to receive and/or send emergency information over IP and other data networks. Based upon certain criteria, the methods and systems determine whether to transfer a VoIP communication and/or other emergency information to another entity associated with the IP network.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A method of transferring a digital voice call at a public safety answering point, comprising:
   receiving, by a controller, an analog voice call from a caller;
   converting, by the controller, the analog voice call to the digital voice call;
   collecting, by the controller, information from the caller;
   determining, by the controller, whether to transfer the digital voice call to a subsequent public safety answering point, wherein the determining comprises determining whether the subsequent public safety answering point is compatible with a recognized transmission schema by querying the subsequent public safety answering point requesting an acknowledgement from the subsequent public safety answering point of the recognized transmission schema; and
   when the subsequent public safety answering point acknowledges the recognized transmission schema, transferring, by the controller, the digital voice call and the information that is collected to the subsequent public safety answering point via a voice over internet protocol connection.

2. The method of claim 1, wherein the converting the analog voice call to the digital voice call, comprises:
   converting the analog voice call to a voice over internet protocol format, wherein the converting the analog voice call to the voice over internet protocol format only occurs when it is determined that the analog voice call needs to be transferred to the subsequent public safety answering point.

3. The method of claim 1, further comprising:
   determining whether the subsequent public safety answering point is associated with an internet protocol network.

4. The method of claim 1, further comprising:
   determining whether the subsequent public safety answering point is associated with a public switched telephone network.

5. The method of claim 2, wherein the converting the analog voice call to the digital voice call, comprises:
   converting the analog voice call to the voice over internet protocol format upon receiving the analog voice call from the caller.

6. The method of claim 3, further comprising:
   transferring the digital voice call to the subsequent public safety answering point associated with the internet protocol network when the subsequent public safety answering point is in communication with the internet protocol network.

7. The method of claim 4, further comprising:
   transferring the analog voice call to the subsequent public safety answering point associated with the public switched telephone network when the subsequent public safety answering point is not in communication with an internet protocol network.

8. The method of claim 6, wherein the converting the analog voice call to the digital voice call, comprises:
   converting the analog voice call to a voice over internet protocol format after receiving the analog voice call from the caller but before transferring the digital voice call to the subsequent public safety answering point in communication with the internet protocol network.

9. The method of claim 8, further comprising:
storing information pertaining to the digital voice call that is in the voice over internet protocol format and the information that is collected in a shared folder; and
providing a link for access by others associated with the internet protocol network.

10. A method, comprising:
receiving a voice over internet protocol communication at a controller of a first public safety answering point in communication with an internet protocol network;
receiving information at the controller of the first public safety answering point via the internet protocol network, wherein the receiving the information comprises collecting information from a caller; and
determining, by the controller, whether to transfer the voice over internet protocol communication and the information to a subsequent public safety answering point associated with the internet protocol network, wherein the determining whether to transfer the voice over internet protocol communication and the information to the subsequent public safety answering point comprises determining whether the subsequent public safety answering point is compatible with voice over internet protocol equipment; and
determining, by the controller, whether the subsequent public safety answering point is compatible with a recognized transmission schema by querying the subsequent public safety answering point and requesting an acknowledgement from the subsequent public safety answering point of the recognized transmission schema.

11. The method of claim 10, further comprising:
transferring the voice over internet protocol communication and the information to the subsequent public safety answering point when the first public safety answering point cannot respond to the voice over internet protocol communication.

12. The method of claim 10, further comprising:
storing information related to the voice over internet protocol communication and the information in a shared folder for access by other public safety answering points associated with the internet protocol network.

13. The method of claim 10, further comprising:
receiving handshake messages across the internet protocol network to determine which public safety answering points are in communication with the internet protocol network.

14. The method of claim 10, further comprising:
maintaining a record of the voice over internet protocol communication and the information at a designated server in communication with the Internet protocol network.

15. The method of claim 11, further comprising:
maintaining communication with the first public safety answering point while the subsequent public safety answering point responds to the voice over internet protocol communication.

16. The method of claim 13, further comprising:
providing a database containing information related to the public safety answering points that are in communication with the internet protocol network.

17. A system of managing call information at a public safety answering point, comprising:
a controller; and
a non-transitory computer-readable medium storing a plurality of instructions which, when executed by the controller, cause the controller to perform operations, the operations comprising:
receiving an analog voice call from a caller;
converting the analog voice call to a digital voice call;
collecting information from the caller;
determining whether to transfer the digital voice call to a subsequent public safety answering point, wherein the determining determines whether the subsequent public safety answering point is compatible with a recognized transmission schema by querying the subsequent public safety answering point with an acknowledgement message, requesting an acknowledgement from the subsequent public safety answering point of the recognized transmission schema; and
transferring the digital voice call, and the information that is collected to the subsequent public safety answering point when the subsequent public safety answering point acknowledges the recognized transmission schema via a voice over internet protocol connection.

18. The system of claim 17, wherein the converting the analog voice call to the digital voice call, comprises:
converting the analog voice call to a voice over internet protocol format, wherein the converting converts the analog voice call to the voice over internet protocol format only when it is determined that the analog voice call needs to be transferred to the subsequent public safety answering point.

19. The system of claim 17, wherein the operations further comprise:
determining whether the subsequent public safety answering point is associated with an internet protocol network.

20. The system of claim 19, wherein the operations further comprise:
transferring the digital voice call to the subsequent public safety answering point associated with the internet protocol network when the subsequent public safety answering point is in communication with the internet protocol network.

* * * * *